Nov. 15, 1949     J. H. BOLLMAN ET AL     2,488,371
NAVIGATIONAL APPARATUS

Filed Aug. 1, 1945     3 Sheets-Sheet 1

INVENTORS   J.H. BOLLMAN
F.A. BROOKS
J.G. KREER JR.

BY

ATTORNEY

Nov. 15, 1949

J. H. BOLLMAN ET AL 2,488,371

NAVIGATIONAL APPARATUS

Filed Aug. 1, 1945

INVENTORS  J.H. BOLLMAN
           F.A. BROOKS
       BY  J.G. KREER JR.

N. D. Ewing
ATTORNEY

Patented Nov. 15, 1949

2,488,371

UNITED STATES PATENT OFFICE 2,488,371

NAVIGATIONAL APPARATUS

John H. Bollman, Rutherford, Fred A. Brooks, Maplewood, and John G. Kreer, Jr., Bloomfield, N. J., assignors to Bell Telephone Laboratories, Incorporated, New York, N. Y., a corporation of New York Application August 1, 1945, Serial No. 608,286, 5 Claims. (Cl. 177—386)

1

This invention relates to an echo ranging system, and particularly to an arrangement for producing a plurality of navigational readings on a single indicator in such system.

In the use of underwater echo ranging systems at sea, certain navigational readings such, for example, as the bearing of the sound projector relative to true north, range of the target, training of the sound projector relative to the target, and course of the ship relative to true north, are essential in order to promote the most efficient use of the system. Heretofore, these readings having been obtained by mechanisms designed to operate two or more individual indicators.

The main object of the invention is to produce expeditiously on a single indicator a plurality of essential navigational readings used in an underwater echo ranging system.

In an underwater echo ranging system described hereinafter and constituting a specific embodiment of the invention, there are combined a cathode-ray oscilloscope including deflecting coils a sound projector, a potentiometer having two brushes fixedly disposed at 90 degrees relative to each other for supplying two voltages to the deflecting coils, and a shaft connected to these brushes and rotated in response to changes in the ship's course. Such rotation of the shaft effects a proportional angular change in the positions of the two brushes in the potentiometer whereby the voltages supplied to the deflecting coils are varied as the sine and cosine of the angle of rotation of the shaft. This in conjunction with other features of the system produces expeditiously on the CRO screen respective indications of (a) course of the ship relative to true north, (b) range of the target, (c) training of the sound projector relative to the target, that is, whether such projector is trained directly "on" the target, or to the right or left thereof, and (d) bearing of the sound projector relative to true north.

The invention will be readily understood from the following description taken together with the accompanying drawing in which:

Figs. 1 and 2 show an underwater echo ranging

Figure 1:
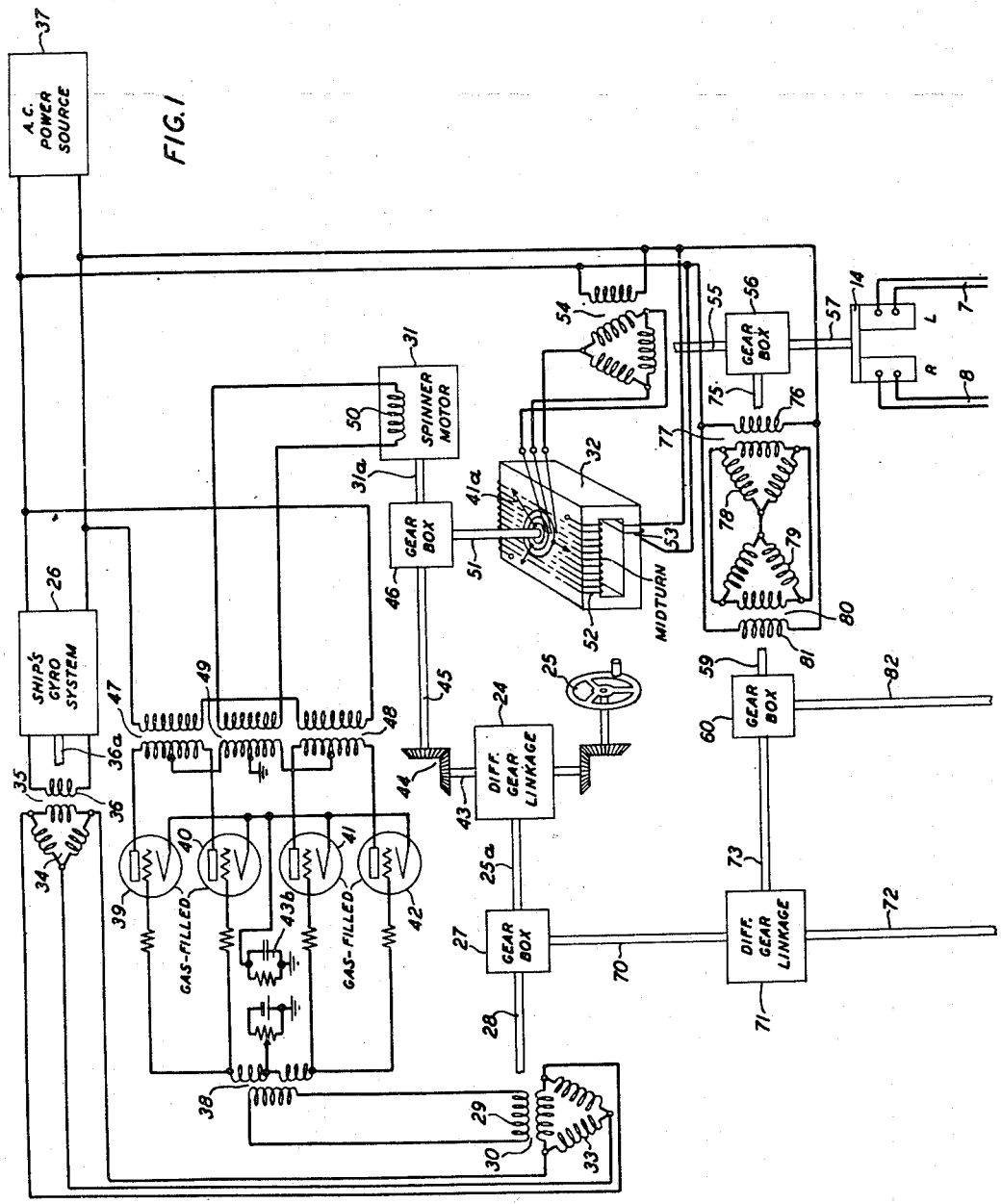
Figs. 1 and 2 are a schematic illustration of an underwater echo ranging system including a specific embodiment of the invention.
Figure 2:
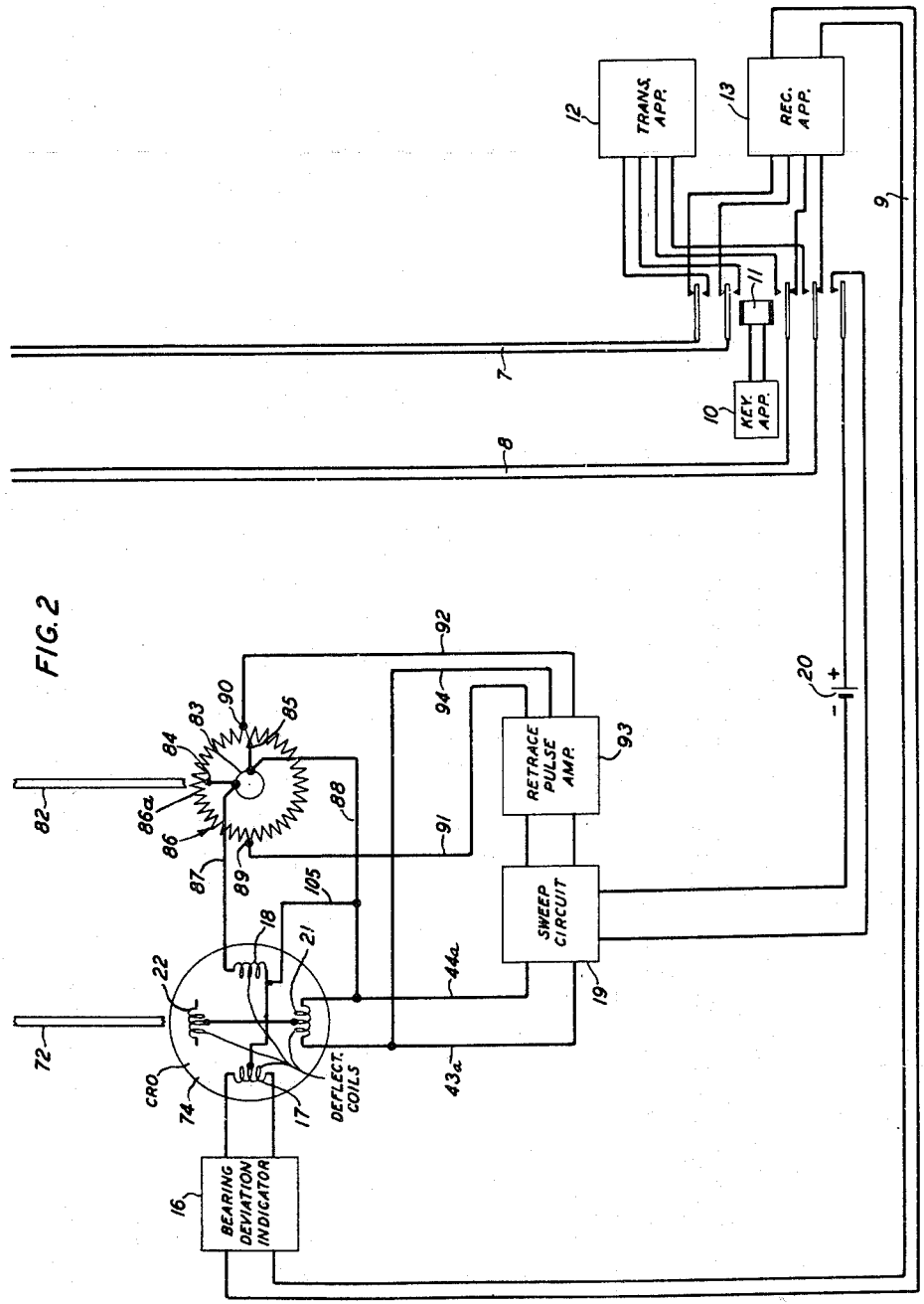

2 system for ascertaining both the distance to and the right or left direction of a target, with reference to a ship on which such system is located. Referring to Figs. 1 and 2, the system comprises a keying apparatus 10 for controlling the energization and deenergization of an electromagnetic relay 11 whereby transmitting apparatus 12 and receiving apparatus 13 are alternatively connected via conductor pairs 7 and 8 to a sound projector or transceiver 14 embodying right and left halves R and L, respectively, and having a unidirectional action that will be mentioned later. The output of receiving apparatus 13 is connected over conductor path 9 to the input of a bearing deviation indicator 16 whose output is connected to deflecting coils 17 and 18 of cathode-ray oscilloscope CRO having a luminescent screen. The bearing deviation indicator 16, as will be hereinafter pointed out, produces on the CRO screen visual indications of the range of the target and of the training of the unidirectional action of the transceiver 14 whether to the right or left of the target or "on" the target. Thus, the bearing deviation indicator 16 shows essentially the right or left direction of the target relative to unidirectional action of the transceiver 14.

In the operation of the circuit portion described so far, the keying apparatus 10 normally connects transceiver 14 to receiving apparatus 13 via the respective back contacts of relay 11 which is deenergized, as shown in Fig. 2. When the keying apparatus 10 is operated to energize relay 11, the transmitting apparatus 12 supplies an electrical pulse having a frequency say, of the order of 24 kilocycles per second, to both halves R and L of the transceiver 14, via the front contacts of relay 11. The transceiver 14 translates such electrical pulse into a sound pulse and imparts the latter into the surrounding water in a unidirectional beam. Immediately thereafter the keying apparatus 10 deenergizes relay 11 to disconnect the transmitting apparatus 12 from the transceiver 14 and to reconnect the receiving apparatus 13 thereto.

When the sound pulse strikes a distant object or target in the water, a portion of the sound pulse is reflected therefrom as an echo and is ultimately picked up by the transceiver 14 and thereby translated into an electrical pulse. The latter pulse is supplied to the bearing deviation indicator 16 for a purpose that will be presently explained. When the relay 11 was operated to the transmitting condition as just explained, its lowermost lower front contact served to apply direct current from source 20 to sweep circuit 19. This causes a sweep voltage to be applied to deflecting coils 21 and 22 via leads 43a, 44a and thereby to start a cathode-ray trace extending in a radial direction on the CRO screen. Depending on the training of the unidirectional beam of the transceiver 14 relative to the target, the bearing deviation indicator 16 causes the trace to assume a configuration characterized as follows. When the unidirectional beam of the transceiver 14 is trained directly on the target, no appreciable change is made in the configuration of the cathode-ray trace except a bright spot is produced therein as explained subsequently. As the unidirectional beam of the transceiver 14 is trained to the right or left of the target, the cathode-ray trace is caused to move sharply to the right or left, respectively, whereby a "pip" is introduced into the configuration of the trace. Since the CRO screen is calibrated in yards along a radial line, the location of the "pip" in the trace along such line will indicate directly the distance to the target. The position of the "pip" on the right or left side of the trace will indicate the transceiver is trained to the right or left, respectively, of the target. For each actuation of the keying apparatus 10 as above explained, the sweep circuit 19 goes through one cycle of its operation. For further details regarding the system described thus far, reference is made to the copending application of J. H. Bollman Serial No. 520,875, filed February 3, 1944, and to the copending application of J. G. Kreer, Jr., Serial No. 561,448, filed November 1, 1944.

The transceiver 14 is rotated in azimuth by a mechanism actuated by a handwheel 25 or by the ship's gyro-compass system 26. Handwheel 25 is mechanically connected via differential gear linkage 24, shaft 25a, gear box 27 to shaft 28 carrying rotor 29 of synchrocontrol transformer 30. Differential gear linkage 24 is also mechanically connected through shaft 43, bevel gears 44 and shaft 45 to gear box 46. Stator 33 of synchrocontrol transformer 30 is connected to stator 34 of transmitting synchro generator 35 which includes a rotor 36. This rotor is electrically connected to the ship's gyro-compass system 26 energized from a source 37 of alternating current power, and is also mounted on a shaft 36a rotated by the ship's gyro-compass system 26 in the familiar manner.

Rotor 29 is connected through transformer 38 to the input circuits of gas-filled tubes 39, 40, 41 and 42 whose anode circuits are connected by transformers 47 and 48 to the alternating power source 37 and by transformer 49 to winding 50 of spinner motor 31. This motor is mechanically connected by shaft 31a, gear box 46 and shaft 51 to brushes 41a movably positioned on secondary winding 52 of a commutator transmitter 32 whose primary winding 53 is energized from the alternating power source 37; and also via gear box 46 to the rotor 29 through the mechanical connection previously traced. The secondary winding 52 is connected via brushes 41a to the delta-connected winding of training motor 54 having a single-phase winding connected to the alternating power source 37. A shaft 55, gear box 56 and shaft 57 connect the training motor 54 to the transceiver 14. Gear box 56 also includes a shaft 75 on one end of which is positioned rotor 76 of a transmitting Selsyn motor 77 having a three-phase stator 78. This stator is connected directly to three-phase stator 79 of a receiving Selsyn motor 80 whose rotor 81 is mounted on one end of a shaft 59 that has its opposite end connected to gear box 60. A shaft 73 has one end connected to gear box 60 and its opposite end to differential gear linkage 71. The rotors 76 and 81 are electrically connected in parallel to the alternating power source 37.

In the operation of the foregoing mechanism for rotating the transceiver 14 in azimuth either actuation of handwheel 25, effecting rotation of shaft 28 and rotor 29 thereon, or operation of the ship's gyro-compass system 26, causing rotation of shaft 36a and rotor 36 thereon, establishes electrical unbalance in the transformer 30 whereby a voltage of certain magnitude and sign is applied through transformer 38 to the input circuits of gas-filled tubes 39, 40, 41 and 42. This voltage, depending on its sign, causes either tubes 39 and 42 or 40 and 41 to fire when such voltage is in phase with the voltage in the anode circuits of the respective tubes whereby a voltage of certain sign and magnitude is applied from the alternating power source 37 through transformer 49 to the winding 50 of spinner motor 31. As a consequence, spinner motor 31 is caused to rotate in either a clockwise or counter-clockwise direction, depending on the sign and magnitude of its energizing voltage, to repeat the corresponding rotation of handwheel 25 or change in the ship's compass embodied in the ship's gyro system 26. Rotation of spinner motor 31 imparts rotary movement to shaft 31a, gears in gear box 46 and shaft 51 and thereby to the brushes 41a on the winding 52. The positioning of the brushes 41a relative to the midturn of secondary winding 52 of the commutator transmitter 32 determines the magnitude and phase of a three-phase voltage supplied to the delta-connected winding of training motor 54. The interaction of the magnetic fields due to the voltage effective in the delta-connected and single-phase windings of training motor 54 produces a torque whose direction and magnitude depend on the relative magnitudes and phase of the voltages of the respective windings. This torque effects rotation of shaft 55, gears in gear box 56, and shaft 57 and thereby rotation of the transceiver 14 in azimuth in either clockwise or counter-clockwise directions, depending on the direction of rotation of handwheel 25 or change in the ship's course as above mentioned. An R-C network 43b connected to cathodes of the gas-filled tubes 39, 40, 41 and 42 aids in rotating the transceiver 14 to its final position without hunting or overshooting. For further details concerning the foregoing mechanism for rotating the transceiver 14 in azimuth reference is made to the copending application of J. H. Bollman, Serial No. 585,319, filed March 28, 1945, now Patent No. 2,478,740, issued August 9, 1949.

The differential action of the differential gear linkage 24 is so arranged that, in response to actuation by handwheel 25, rotary movement is imparted to the shaft 25a and the gears and shafts associated therewith to establish electrical unbalance in the transformer 30 as above explained but no rotary movement is imparted to the shaft 43 and the gears and shafts connected thereto. However, the differential action of the differential gear linkage 24 is further arranged that, in response to the rotation of the gears in gear box 46 by motor 31, this rotary movement is imparted to shaft 45, gears 44, shaft 43 and gears in differential gear linkage 24, shaft 25a, gears in gear box 27 and thereby to shaft 28. This serves to readjust the position of the rotor 29 to restore electrical balance to the transformer 30 and thereby disconnect the voltage from the motor 31 at the cessation of the actuation of handwheel 25 or change in the ship's course. When electrical unbalance is established in the synchrocontrol transformer 30 by an initially predetermined rotation of the shaft 25a in response to actuation of the handwheel 25 for causing a predetermined rotation of the transceiver 14 in azimuth, electrical balance is restored to the synchrocontrol transformer 30 by an equivalent rotation of the shaft 25a in the opposite direction under control of the motor 31 as above mentioned. Thus, the handwheel 25 serves to rotate the transceiver 14 in azimuth with no net rotation of the shaft 25a.

When, however, electrical unbalance is established in the synchrocontrol transformer 30 under control of the ship's gyro system 26 in response to changes in the ship's course, the ship's gyro system 26 initially rotates the shaft 36a associated therewith and carrying rotor 36 of synchrogenerator 35 but does not directly affect the position of the shaft 25a or that of the rotor 29 of synchrocontrol transformer 30. Rotation of the rotor 36 of synchrogenerator 35 varies the magnitude of the voltage induced in the winding 34 of synchrogenerator 35 and supplied thereby to the winding 33 of synchrocontrol transformer 30 whereby electrical unbalance is introduced therein. As previously explained, this unbalance energizes the motor 31 which produces the rotation of transceiver 14 in azimuth and the initial rotation of shaft 25a to an amount depending on the magnitude of the change in the ship's course. This initial rotation of the shaft 25a serves, as previously explained, to cause rotation of the rotor 29 of the synchrocontrol transformer 30 until electrical balance is restored thereto. This initial rotation remains in the shaft 25a until the ship again changes its course. Thus, the ship's gyro system 26 serves to rotate the transceiver 14 in azimuth with net rotation of the shaft 25a. Inasmuch as the shaft 25a is rotated under the control of the ship's gyro-compass system 26 in response to changes in the ship's course, the rotational position of the shaft 25a gives the ship's course relative to true north.

Referring again to Figs. 1 and 2, gear box 27 is connected via shaft 70, differential gear linkage 71, and shaft 72 to a frame 74 carrying the deflecting coils 17, 18, 21 and 22 in fixed relation and insulated therefrom. As the transceiver 14 is rotated in azimuth in the manner hereinbefore mentioned, frame 74 and the deflecting coils 17, 18, 21 and 22 thereon are rotated in clockwise or counter-clockwise direction about the cathode-ray in the oscilloscope. Instead of the cathode-ray trace rising only along a single radial direction, this trace may also extend in radial direction through 360 degrees from the center of the CRO screen. Hence, the CRO screen may be calibrated with a plurality of circles concentrically positioned with reference to the center thereof and equally spaced to indicate the target range from 0 to 1,000 yards. An outermost circle 100 disassociated from the range circles is calibrated in 360 degrees. Multiplying factors of 2, 3, 5 and 10 may be embodied in the sweep circuit 19 in the well-known manner to provide effective ranges of 2,000, 3,000, 5,000 and 10,000 yards, respectively. Other multiplying factors may be utilized to provide other ranges.

The portion of system of Figs. 1 and 2 above described, is so arranged that when the transceiver 14 has its unidirectional beam trained directly on true north and the bow of the ship along the fore-aft line thereof, the deflecting coils 17, 18, 21 and 22 are positioned as shown in Fig. 2. Accordingly, the sweep circuit 19 and deflecting coils 21 and 22 will cause the cathode-ray trace to rise vertically upwardly toward true north on the CRO screen, and the bearing deviation indicator 16 and deflecting coils 17 and 18 will vary the configuration of the cathode-ray trace to indicate the range, and the right-left training of the transceiver 14, as hereinbefore explained.

When the unidirectional beam of the transceiver 14 is trained directly on true east, the deflecting coils 17, 18, 21 and 22 will be displayed 90 degrees in a clockwise direction relative to their positions in Fig. 2. As a consequence, the sweep circuit 19 and deflecting coils 21 and 22 will cause the cathode-ray trace to extend horizontally to the right toward true east. Assuming the unidirectional beam of the transceiver 14 to be trained directly on the target, the received echo will so operate the bearing deviation indicator 16 and thereby the deflecting coils 17 and 18 as to cause no appreciable change in the configuration of the horizontal cathode-ray trace. Should, however, the unidirectional beam of the transceiver 14 be trained to the right or left of the target, then the received echo will so operate the bearing deviation indicator 16 and thereby the deflecting coils 17 and 18 as to cause a "pip" to occur below or above, respectively, the horizontal cathode-ray trace.

When the unidirectional beam of the transceiver 14 is trained directly on true south, or the stern of the ship, along the fore-aft line thereof, the deflecting coils 17, 18, 21 and 22 will be displaced 180 degrees relative to their positions in Fig. 2. The action of the cathode-ray trace and "pips" described above regarding true north will be repeated except now the cathode-ray trace will extend vertically downwardly toward true south, and the "pips" will provide opposite indications as to the right or left direction of the target. When the unidirectional beam of the transceiver 14 is trained directly on true west, the deflecting coils 17, 18, 21 and 22 will be displaced 90 degrees in a counter clockwise direction relative to their positions in Fig. 2. The action of the cathode-ray trace and "pips" explained previously concerning true east will be repeated except now the cathode-ray trace will extend horizontally to the left toward true west and the "pips" will provide opposite indications as to the right or left direction of the target.

Let it be assumed the transceiver 14 has been trained by handwheel 25 as described hereinbefore to a bearing of 020 degrees relative to true north. This means that the motor 31 has been energized to rotate the transceiver 14 the desired amount, and has been deenergized thereafter, as hereinbefore described. Also, this means rotary movement has been imparted to the gears of differential gear linkage 24, shaft 25a, gears in gear box 27, shaft 70 and gears of differential gear linkage 71. This movement tends to rotate the shaft 72 and thereby the frame 74 carrying the deflecting coils 17, 18, 21 and 22 in a clockwise direction, but due to the differential action of gear linkage 71 fails to disturb the shaft 73. Since in response to actuation of the handwheel 25, the transceiver 14 is rotated in azimuth with no net rotation of the shaft 25a as above described, it is obvious in this case that the shaft 25a causes no net rotation of the shafts 70 and 72, and of frame 74. At the same time, however, the gears in gear box 56 effect rotation of the shaft 75 and the rotor 76 carried thereby. This changes the phase and magnitude of the three-phase voltage induced in the stator 78 and supplied to the stator 79. As a consequence, the interaction of the magnetic fields occasioned by the alternating voltages effective in the associated stator 79 and rotor 81 produces a torque whose magnitude and direction depend on the relative phase and magnitude of the alternating voltages effective in the respective rotor and stator. This torque effects corresponding rotation of the shaft 59, gears in gear box 60, shaft 73 and gears in differential gear linkage 71.

Due to the differential action of the differential gear linkage 71, the rotation of shaft 73 does not disturb the rotational position of shaft 70 but does tend to affect the rotational position of the shaft 72 in a manner that will now be explained. The rotational position of the shaft 73 follows the training of the unidirectional beam of the transceiver 14 relative to the bow of the ship, and, therefore, the shaft 73 gives the direction of such training of the transceiver 14. In response to the rotation of shaft 70 as above-mentioned, the gears in differential gear linkage 71 tend to rotate the shaft 72 in one rotary direction, but in response to the rotation of shaft 73 tend to rotate the shaft 72 in the opposite rotary direction. Thus the effective amount of rotation of the shaft 72 comprises the difference between the rotary movements of the shafts 70 and 73.

As the rotational position of the shaft 25a, and therefore the corresponding position of the shaft 70, gives the ship's course relative to true north, and as the rotational position of the shaft 73 gives the training of the unidirectional beam of the transceiver 14 relative to the bow of the ship, then the rotational position of the shaft 72, which is the difference between the rotational positions of the shafts 70 and 73, gives the direction of training of the unidirectional beam of the transceiver 14 relative to true north. Accordingly, the shaft 72 rotates the frame 74 and thereby the deflecting coils 17, 18, 21 and 22 about the cathode-ray so as to deflect the cathode-ray in such manner that the trace produced on the oscilloscope screen indicates the training of the unidirectional beam of the transceiver 14 relative to true north. This will now be described, and as previously assumed, will be 020 degrees relative to true north.

Figure 3:
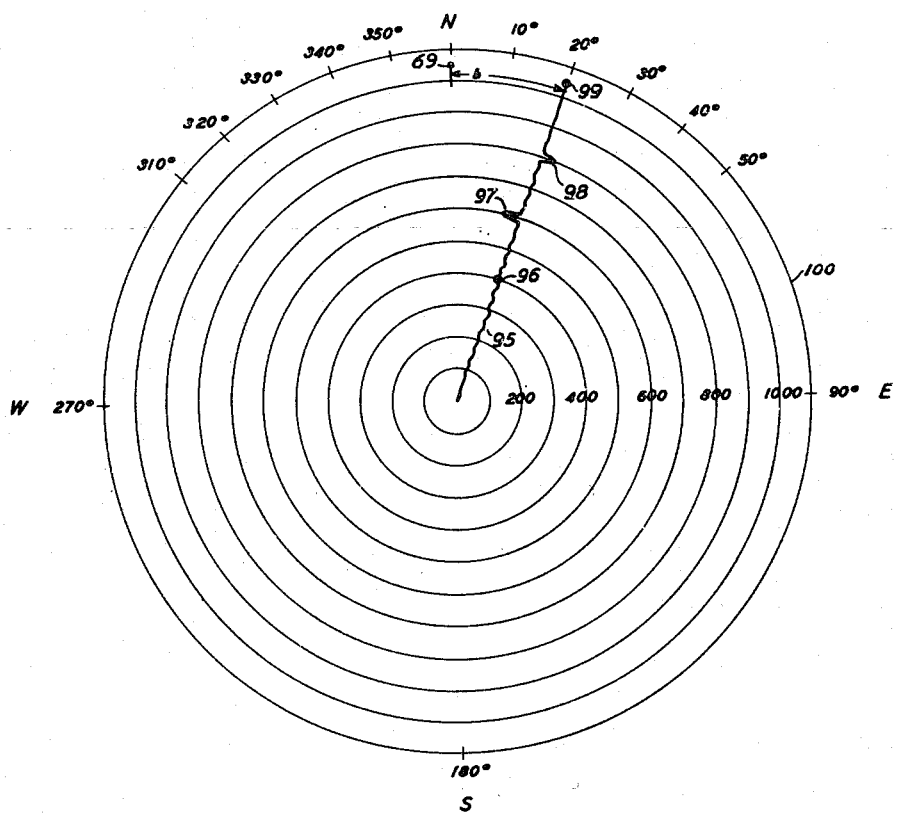
Fig. 3 is an indication of several navigational readings produced on a single indicator in accordance with Figs. 1 and 2.

The transmitting apparatus 12 is now operated to energize transceiver 14 whereby a sound pulse is imparted into the surrounding water, and subsequent thereto the receiving apparatus 13 is conditioned to receive the echo from the target as hereinbefore explained. At the instant of the transmission of the sound pulse, an impulse of direct current from the source 20 is supplied to the sweep circuit 19 which energizes the deflecting coils 21 and 22. As a consequence, the cathode-ray trace 95 of substantially smooth contour is caused to extend in an oblique and upward direction to the right from the center of the CRO screen as shown in Fig. 3. In due course, the echo is picked up by the transceiver 14, supplied to the receiving apparatus 13, and thereafter passed along to the bearing deviation indicator 16. This indicator energizes the deflecting coils 17 and 18 which thereupon produce, for example, the relatively bright spot 96 which indicates a range of 400 yards to the target and the transceiver 14 is directly trained "on" the target.

Instead of the spot 96, let it be assumed the echo eventually caused, as a second example, "pip" 97 in the cathode-ray trace 95. This would indicate a range of 600 yards and the direction of the target was to the left of the transceiver 14. Rotating transceiver 14 in a counter-clockwise direction would eventually train it "on" the target to duplicate the spot 96 at 600 yards. Instead of either spot 96 or "pip" 97, let it be assumed the echo effects, as a third example, "pip" 98 in the cathode-ray trace 95. This would indicate a range of 800 yards and the direction of the target was to the right of transceiver 14. Rotating transceiver 14 in a clockwise direction by the handwheel 25 would subsequently train the former "on" the target to duplicate the bright spot 96 at 800 yards. Continuation of the cathode-ray trace 95 substantially to the point 99 would indicate the bearing of the unidirectional beam of the transceiver 14 to be approximately 020 degrees relative to true north, as previously assumed. In the absence of an echo, the cathode-ray trace would extend substantially smoothly to the point 99 to indicate only such bearing of transceiver 14 relative to true north.

Similar action may be traced in the above-described circuit when unbalance is introduced in the transformer 30 in response to changes in the ship's course. In this case, however, the training of the unidirectional beam of the transceiver 14 is adjusted relative to the bow of the ship but is unchanged relative to true north.

Thus, the portion of the system of Figs. 1 and 2 hereinbefore explained produces simultaneously on the CRO screen indications of (a) the range of the target, (b) the training of the unidirectional beam of transceiver 14 relative to the target, that is, whether this beam is disposed directly "on" the target, or to the right or left thereof, and (c) the bearing of the unidirectional beam of transceiver 14 relative to true north.

In accordance with important features of the present invention there is produced on the same CRO screen an indication of the bearing of the ship relative to true north.

Referring to Figs. 1 and 2, shaft 82 has its upper end connected to gear box 60 and its lower end joined to a rotatable frame 83 in which is mounted arms or brushes 84 and 85 suitably insulated therefrom and fixedly located at 90 degrees with reference to each other for slidable movement on resistor 86a, the arms and resistor constituting a potentiometer 86.

Figure 4:
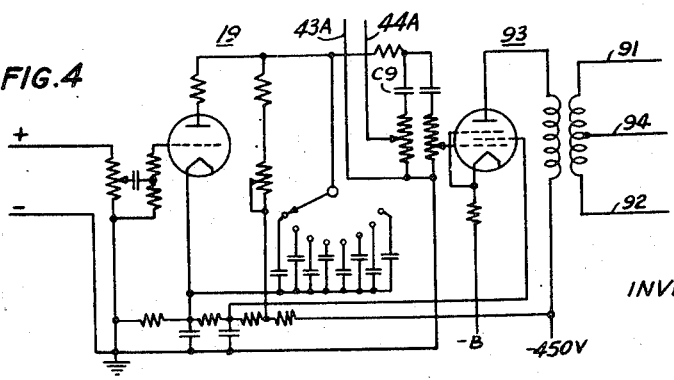
Fig. 4 is a schematic circuit illustrating the connections of the sweep circuit and retrace pulse amplifier shown in box form in Fig. 2.

Brush 84 is connected by lead 87 to deflecting coil 18, and brush 85 by lead 88 to lead 44a and thereby to deflecting coil 21. Diametrically opposite points 89 and 90 on the resistor 86a are connected by leads 91 and 92, respectively, to the output of retrace pulse amplifier 93 whose input is connected to sweep circuit 19 and whose operation will be explained later. Lead 94 also connects the output of retrace pulse amplifier 93 to lead 43a and thereby to deflecting coils 21 and 22. The circuit connections of the sweep circuit 19 and retrace pulse amplifier 93 shown in Fig. 4 are conventional, and are illustrated, for example, on data sheet 2, December 15, 1944, of the Radio Corporation of America tube handbook. In the circuit of Fig. 4, the condenser C9 is so proportioned as to pass the rapidly varying or decreasing portion of the saw-tooth sweep voltage but to block the slowly varying or increasing portion of the saw-tooth sweep voltage. Thus, the amplified retrace or decreasing portion of the saw-tooth wave of the sweep circuit 19 is divided into two portions and applied to the deflecting coils 17, 18, 21 and 22 as follows: One portion in a circuit comprising common lead 94 and lead 92, terminal 90, resistor 86a, arm 85 and lead 88; and a second portion in a circuit including common lead 94 and lead 91, terminal 89, resistor 86a, arm 84, lead 87 and lead 105.

The operation of the specific embodiment of the invention is as follows:

At the time the torque due to the interaction of the magnetic fields of stator 79 and rotor 81 of motor 80 caused rotation of shaft 59, gears of gear box 60 and thereby shaft 73, it also caused the gears of gear box 60 to effect rotation of shaft 82 in a predetermined direction through a certain angle, say, for example, angle σ. This angle is the direction angle between the fore-aft line of the ship and the unidirectional beam of transceiver 14. The angular movement σ causes the brushes 84 and 85 to move a proportional angular distance in a corresponding direction on the resistor 86a. As a consequence, the two voltages applied to the deflecting coils 17, 18, 21 and 22 in the circuits previously traced are varied in accordance with changes in the angle σ to produce on the CRO screen a spot 69 in a manner that will now be explained.

The retrace pulse amplifier 93, Fig. 2, has a frequency characteristic for selecting the high frequency component of the decreasing portion of the saw-tooth wave produced in the sweep circuit 19 as above mentioned with reference to Fig. 4. For the purpose of this explanation, the component so amplified may be designated voltage E which is divided into two portions and applied to the deflecting coils 17, 18, 21 and 22 in the circuits previously traced. As the brushes 84 and 85 are actuated through 360 degrees in either a clockwise or a counter-clockwise direction on the resistor 86a, the effective voltages on the respective brushes will vary from a maximum of one sign, through zero, to the maximum of the opposite sign. Due to the mechanical spacing of 90 degrees between the brushes 84 and 85, the effective voltages on the respective brushes will be displaced 90 degrees. Thus, a voltage E sin σ is effective between common lead 94 and brush 85; and a voltage E cos σ is effective between common lead 94 and brush 84. These voltages are applied to the respective deflecting coils 17, 18, 21 and 22 by means of the circuits above traced. As a consequence, the cathode-ray spot 69, Fig. 3, is displaced on the CRO screen a distance E sin σ along the axis of coils 17 and 18, and a distance E cos σ perpendicular to the axis of coils 17 and 18. This results in a deflection of the spot 69 from the axis of the coils 17 and 18 at an angle b which is proportional to the angle σ. Since the coils 17 and 18 are rotated a certain angle by the shaft 72 to give the bearing of the unidirectional beam of transceiver 14 relative to true north, as above mentioned, and the angle σ is the angle of the unidirective beam of the transceiver 14 relative to the fore-aft line of the ship as above pointed out, the angular position of the spot 69 on the CRO screen will indicate the difference between these angles, or the bearing of the ship relative to true north. This indication is therefore produced on the single CRO screen together with the other indications previously identified and effected by other features of the system.

What is claimed is:

1. In combination with a system for navigating a steerable vehicle relative to a target, comprising on said vehicle a transceiver for imparting a sound pulse into a surrounding medium and receiving an echo from said target located therein, compass-controlled means for obtaining the bearing of said vehicle relative to true north, manual means for training said transceiver relative to a fore-aft line of said vehicle, an oscilloscope having a screen and beam deflecting coils, and means repsonsive to said echo and to the angular difference between the vehicle's bearing relative to true north and the transceiver's training relative to said vehicle for energizing said coils to produce simultaneously on said screen indications of the range of said target, the training of said transceiver relative to said target, and the bearing of said transceiver relative to true north, means for supplying to said coils two voltages varying as the sine and cosine of the angle of training of said transceiver relative to the fore-aft line of said vehicle to produce on said screen an indication of the bearing of said vehicle relative to true north.

2. A combination according to claim 1 in which said voltage supplying means comprises a shaft rotated an angular amount that is proportional to the angular training of said transceiver relative to the fore-aft line of said vehicle, and means controlled by said shaft for supplying to said coils said two voltages varying as the sine and cosine of said angular amount, said last means producing on said screen said indication of the vehicle's bearing relative to true north and displacing said last indication from the indication of the transceiver's bearing relative to true north a further angular amount that is proportional to said angular amount.

3. A combination according to claim 1 in which said voltage supplying means comprises a potentiometer having a pair of brushes fixedly disposed at 90 degrees relative to each other, a source of voltage, means for connecting said source, potentiometer and brushes in circuit to supply the two voltages to said coils, and a shaft actuating said brushes an angular amount that is proportional to the angular training of said transceiver relative to the fore-aft line of said vehicle, said brushes varying said two voltages as the sine and cosine of said angular amount, said two voltages energizing said coils for producing on said screen said indication of the vehicle's bearing relative to true north and displacing said last indication from the indication of the transceiver's bearing relative to true north a further angular amount that is proportional to said angular amount.

4. In combination with a dirigible vehicle, a navigational instrument on said vehicle comprising a cathode-ray oscilloscope having a pair of deflectors adapted to deflect the cathode-ray in mutually perpendicular directions, said pair being mounted for rotation about said ray, a transceiver for transmitting a pulse of energy in a unidirectional beam from said vehicle and receiving an echo resulting from the reflection of said energy from a distant object, compass-controlled means to actuate said transceiver for maintaining said beam fixed in position relative to true north irrespective of changes in the course of said vehicle, means independent of said last means for manually adjusting the position of said transceiver and thereby said beam with reference to a fore-aft line of said vehicle, means differentially responsive to said compass-controlled means and said manually adjusting means for controlling the rotational position of said pair of deflectors, control means having an angular displacement that is proportional to the angular displacement of said beam with reference to the fore-aft line of said vehicle, means for applying respective operating voltages to said pair of deflectors, and means including said control means for varying said operating voltages as the sine and cosine of said angular displacement of said control means.

5. In an echo ranging system, an object detector comprising an energy beam transceiver adapted to operate with directionally selective effect from a dirigible vehicle, means independent of variations in the heading of said vehicle for varying the direction in which said transceiver is operative with reference to the front end of said vehicle, a cathode-ray oscilloscope including a luminescent screen and a relatively rotatable pair of ray deflector means adapted to deflect the cathode-ray in mutually perpendicular directions across said screen in response to applied deflecting voltage, means operative on said deflector means for repeatedly deflecting said ray across said screen in a predetermined direction fixed relative to the rotational position of said deflector means, means varying the relative rotational position of said deflector means in response to and in conformity with variations in the direction of said vehicle's heading relative to true north and in the direction of the operation of said transceiver with reference to a fore-aft line of said vehicle whereby the position of the trace made by said deflector means as aforesaid directly indicates said direction of operation of said transceiver relative to true north, means for applying separate deflecting voltages to said pair of deflector means, mechanical means movable in response to and in conformity with variations in the angular divergence of the direction of operation of said transceiver with reference to the fore-aft line of said vehicle for correspondingly varying the ratio of said deflecting voltages whereby the position of the trace made by said ray, responsive to said deflecting voltages, directly indicates said heading of said vehicle with reference to true north.

JOHN H. BOLLMAN.
FRED A. BROOKS.
JOHN G. KREER, Jr.

REFERENCES CITED

The following references are of record in the file of this patent:

UNITED STATES PATENTS

| Number | Name | Date |
| --- | --- | --- |
| 1,973,673 | Rice | Sept. 11, 1934 |
| 2,296,032 | Hammond | Sept. 15, 1942 |

FOREIGN PATENTS

| Number | Country | Date |
| --- | --- | --- |
| 497,147 | Great Britain | Dec. 9, 1938 |
| 546,202 | Great Britain | July 2, 1942 |